(12) United States Patent
Mäckel et al.

(10) Patent No.: US 6,420,845 B1
(45) Date of Patent: Jul. 16, 2002

(54) CONTROL DEVICE FOR A WINDSCREEN WIPER SYSTEM

(75) Inventors: Rainer Mäckel, Königswinter; Roland Mauser, Ludwigsburg, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/530,879

(22) PCT Filed: Nov. 3, 1998

(86) PCT No.: PCT/EP98/06940

§ 371 (c)(1),
(2), (4) Date: May 8, 2000

(87) PCT Pub. No.: WO99/24297

PCT Pub. Date: May 20, 1999

(30) Foreign Application Priority Data

Nov. 7, 1997 (DE) .................................. 197 49 258

(51) Int. Cl.⁷ ................................................. B60S 1/08
(52) U.S. Cl. .................... 318/443; 318/444; 318/483; 318/DIG. 2
(58) Field of Search ................. 318/443, 444, 318/483, DIG. 2, 484, 445, 446, 458, 465, 466, 470; 15/250.12, 250.13, 250.18

(56) References Cited

U.S. PATENT DOCUMENTS

| 5,119,002 A | * | 6/1992 | Kato et al. ............... 318/444 |
| 5,412,296 A | * | 5/1995 | Chien et al. ............. 318/444 |
| 5,493,190 A | | 2/1996 | Mueller |
| 5,568,027 A | | 10/1996 | Teder |
| 5,654,617 A | * | 8/1997 | Mills ....................... 318/444 |
| 5,729,106 A | * | 3/1998 | Pientke et al. ........... 318/483 |
| 6,121,741 A | * | 9/2000 | Berger et al. ............ 318/483 |
| 6,239,570 B1 | * | 5/2001 | Tanaka et al. ........... 318/483 |

FOREIGN PATENT DOCUMENTS

EP WO 90 03903 A 4/1990

OTHER PUBLICATIONS

Tetsuya, N., "Patent Abstracts of Japan", Dec. 9, 1993, vol. 017, No. 667 (M–1524), & JP 05 221289 A, (Fujitsu Ten Lts), Aug. 31, 1993, (see abstract).

Minoru, Y., "Patent Abstracts of Japan", Dec. 9, 1993, vol. 017, No. 667 (M–1524), & JP 05 221290 A (Fujitsu Ten Ltd), Aug. 31, 1993 (see abstract).

* cited by examiner

*Primary Examiner*—Khanh Dang
(74) *Attorney, Agent, or Firm*—Venable; Norman N. Kunitz

(57) ABSTRACT

A control device for the driving motor (10) of a windshield system. A manually operated wiper switch (18) is provided for selecting an operating mode, in at least one of which the wiper speed is automatically controlled by a characteristic curve and the signal from a rain sensor (13). To modify the characteristic curve based on the use of the system by an individual driver, the manually operated wiper switch (18) conveys control commands to an adaptation algorithm control in a control circuit (16). The control circuit (16), in response to switching out of the automatic mode, generates a new characteristic curve at a modified operating point, with the new characteristic curve incorporating the modified operating point. When the switching stage which is dependent on the quantity of rain is again activated, the diving motor (11) is controlled according to the new characteristic curve.

16 Claims, 3 Drawing Sheets

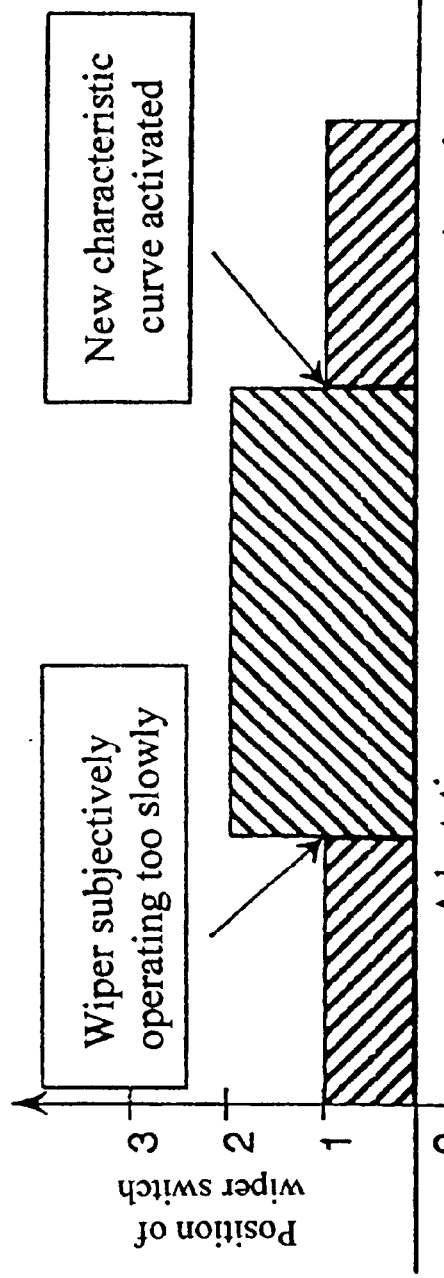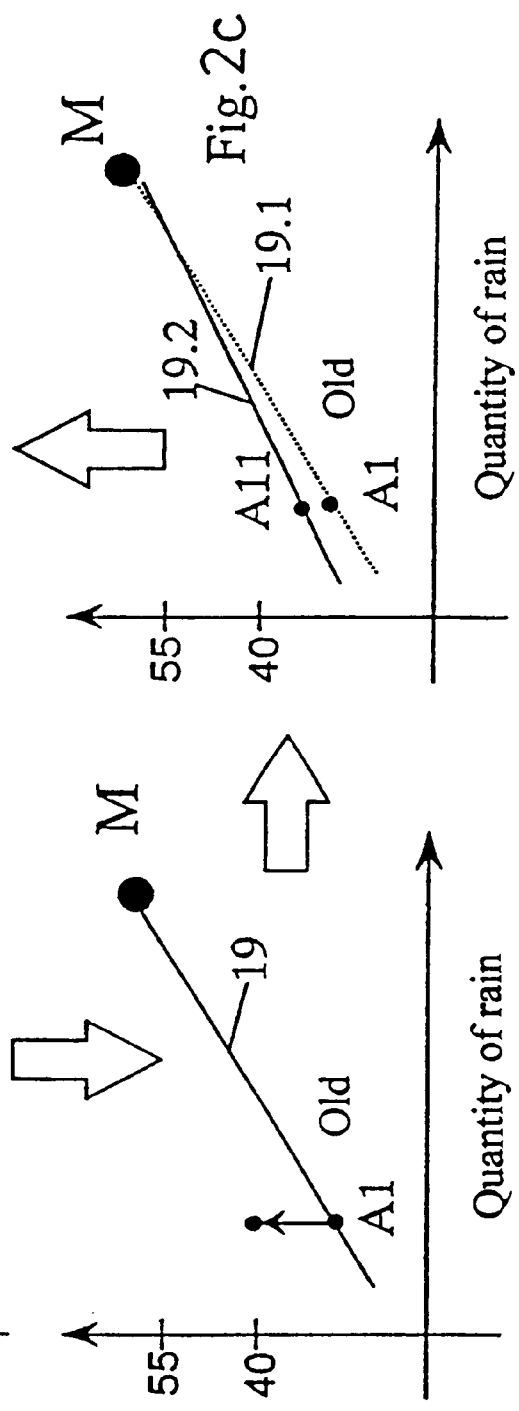

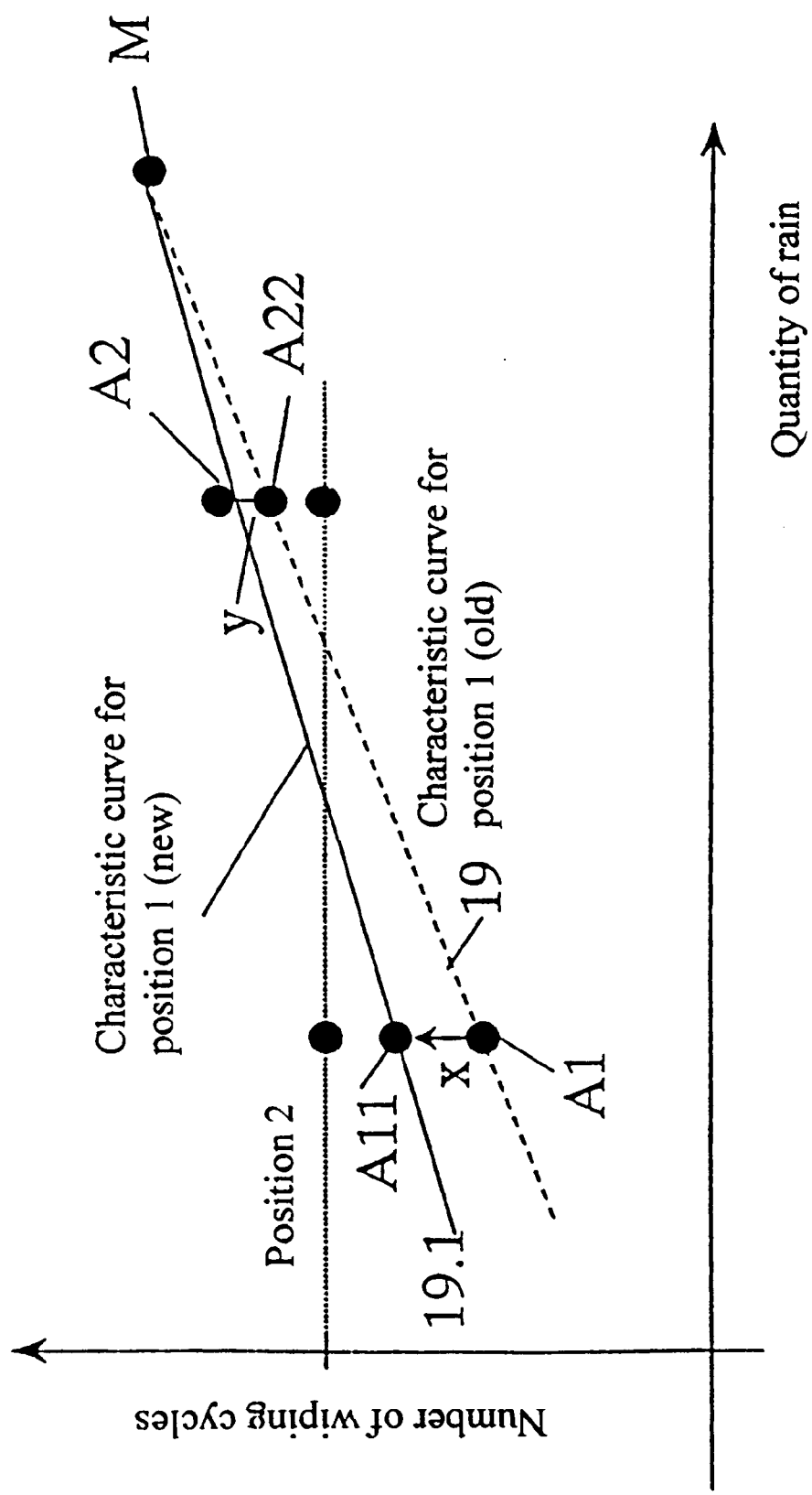

CONTROL DEVICE FOR A WINDSCREEN WIPER SYSTEM

BACKGROUND OF THE INVENTION

The invention relates to a control device for the drive motor of a windshield-wiper device of a vehicle, particularly a motor vehicle, having a control circuit, which can be activated by a manually-operated wiper switch, and automatically controls the drive motor, in a switching stage of the wiper switch, according to a characteristic curve and as a function of a signal of a rain sensor.

JP Abstracts 5-221290 (A) discloses a moisture-controlled windshield-wiper device of the above mentioned type, in which the switching threshold can be altered by means of manually-operated control elements, namely the windshield-wiper selector switch. Two different counters detect how frequently the windshield-wiper selector switch is operated. The one counter detects the switching processes into a higher operating mode, while the other counter detects the switching processes into a lower operating mode. An evaluation circuit reads out the contents of the counters, and raises or lowers the switching threshold for operating the wiper in interval operation. Here, a switch into a higher operating mode effects a lowering of the switching threshold, and thus a shortening of the pause between two wiping actions, whereas a switch into a lower operating mode effects a raising of the switching threshold, and thus a lengthening of the pause between two wiping actions. In interval operation, the windshield-wiper control permits an adaptation of the wiper intervals to the individual wishes of the user.

U.S. Pat. No. 5,568,027 discloses a control device for the drive motor of a windshield-wiper device of a vehicle, particularly a motor vehicle, having a control circuit that can be activated by means of a manually-operated wiper switch, and automatically controls the drive motor in a switching stage of the wiper switch, corresponding to a characteristic curve and as a function of a signal of a rain sensor. The windshield-wiper control avoids abrupt transitions in the wiper movement by using a smoothing algorithm to compare short-time rain-sensor signals, which experience statistical scattering, to the long-time signal behavior of the rain sensor, and by achieving smoothing through the formation of an average value of the long-time behavior of the rain sensor with the short-time behavior of the rain sensor. Furthermore, in interval operation, the wiper control is adapted to the logarithmic perceptive behavior of a person. For this purpose, the logarithm is formed from the counting value of the rain sensor in a microcomputer. This rain intensity, whose logarithm has been taken, is required as a counting value in the smoothing algorithm for further calculations. In interval operation, the driver has the opportunity to influence the value of the rain intensity, whose algorithm has been taken, by selecting a sensitivity pre-selection, and thereby adapt the interval control, to a limited extent, to his personal sensibilities. A characteristic-curve operation is not known from U.S. Pat. No. 5,568,027, however, because the value for the rain intensity is re-calculated every 0.3 seconds. Depending on the quantity of rain that impacts the windshield to be wiped, and is detected by the rain sensor, the pause length between each wiping cycle is reduced as the quantity of rain increases. If the pause length falls below a predetermined value, the drive motor is switched into continuous operation, in which its rpm is initially at a minimum value, and is increased to a maximum rpm with a correspondingly increased wiping-cycle number per time unit as the quantity of rain continues to increase.

In a control device of the type originally described, it is the object of the invention to implement measures that permit the adaptation of the wiping characteristic to the individual wishes of the user in all operating modes, specifically in interval operation as well as continuous operation of the windshield-wiper device.

SUMMARY OF THE INVENTION

In accordance with the invention, the above object generally is achieved by a control device for the drive motor of a windshield-wiper device of a vehicle, particularly a motor vehicle, having a control circuit, which is activated by a manually-operated wiper switch, and automatically controls the drive motor in a switching stage of the wiper switch according to a characteristic curve and as a function of a signal of a rain sensor, and wherein the control circuit pivots in the characteristics curve about an upper end point in response to switching operation of the manually-operated control element of the wiper switch. Further embodiments of the invention are disclosed and described.

In one embodiment of the control device according to the invention, an adaptive wiping characteristic curve is generated, and altered by manually-operated control elements if it does not correspond to the individual needs of the vehicle user. Here, the pause between two wiping actions in interval operation can be altered, and/or the rpm of the drive motor, or the wiping frequency, can be increased or decreased in subsequent, continuous wiping operation. For this purpose, the wiper switch is preferably equipped with the customary three switching stages; the automatic characteristic-curve operation is associated with the first switching stage, while one rpm or a plurality of fixed rpms is specified for the additional switching stage(s). The operating data for the control of the drive motor of the windshield-wiper device, which are established on the load side in the characteristic curve, are programmed to correspond to average requirements. After the automatic characteristic-curve operation has been initiated, an interval operation with long pauses is automatically controlled as a function of the quantity of rain detected per time unit by a rain sensor when the quantity is small; as the quantity of rain increases, the pause length decreases, and as the quantity of rain increases further, the drive motor is switched to continuous operation, in which the rpm is increased to a maximum value as the quantity of rain increases correspondingly.

If the predetermined characteristic curve is not controlling a wiper characteristic that corresponds to the personal wishes of the driver, the characteristic curve can be altered through the initiation of the additional switching stages of the wiper switch. If, for example, the pauses are too long in interval operation, or the wiping frequency is too low in continuous operation, the wiper switch need merely be switched to one of the further switching stages with preset rpms. This switching measure is detected in the control device, and an adaptation-algorithm control that is thereby activated reduces the inclination of the characteristic curve. The end point of the characteristic curve remains at least predominantly fixed in the maximum operating point of the drive motor. This upward pivoting of the characteristic curve about the maximum operating point changes the drive-motor operating data, which are associated with the characteristic curve, such that the pauses in interval operation are respectively shortened, and the rpm of the drive motor, or the wiping frequency of the windshield wiper, is increased in the characteristic-curve segment for continuous operation. In this case, the delay-switching of the wiper switch from the switching stage 1 into the switching stage 2 can effect a preset change, while a more dramatic elevation of the characteristic curve, in contrast, can be controlled in a through-switching from the switching stage 1 to the switching stage 3. Repeated back-switching to new delay-switching of the wiper switch can effect a stage-wise elevation of the characteristic curve or a decrease in the inclination of the characteristic curve by means of the algorithm control. Thus, back-switching of the wiper switch into the first switching stage for automatic operation creates a characteristic curve for rain-dependent control of the windshield-wiper device that approximately matches the driver's needs.

If, in contrast, the operating point on the rain-quantity-dependent characteristic curve provides the drive motor with operating data that result in a too-frequent wiping sequence for the driver's individual needs, it is possible to retract the characteristic-curve data in such a way that the curve inclination again increases steeply, the pause lengths in interval operation become larger and the wiping frequency in the characteristic-curve region above this is slowed. Here, it is assumed that the current characteristic curve for automatic operation that is dependent on the quantity of rain is actuated in a region located above the number of wiping cycles, or the rpm of the drive motor, that the switching position 2 of the wiper switch presets. Accordingly, if the user switches the wiper switch from the switching position 1 specified for automatic operation to the switching position 2, the operating data predetermined by the switching position 2 lie below the operating data predetermined by the current characteristic curves.

In the algorithm control, the obtained control signal effects a reduction in the operating data, not merely for this operating point, but over the entire characteristic-curve quantity. In the process, the highest operating point of the characteristic curve, which is associated with the largest detected quantity of rain, again remains unchanged. A new characteristic curve can be determined, or a shift can be made to one of a plurality of predetermined characteristic curves. In addition, if the wiper switch is switched into its zero position, and the rain sensor continues to signal a significant quantity of rain as the vehicle engine runs, a control command that is thereby obtained can be used to increase the inclination of the characteristic curve, or change its course such that the pauses in interval operation are lengthened, and the continuous wiping cycles in the upper region of the characteristic curve are reduced.

The invention is described below by way of schematic representations.

BRIEF DESCRIPTION OF THE DRAWINGS

FIG. 2a–2c are schematic representations of the steps for altering a characteristic curve associated with the control device according to the invention.

FIG. 3 shows a characteristic curve having different operating points.

DESCRIPTION OF THE PREFERRED EMBODIMENTS

Figure 1:
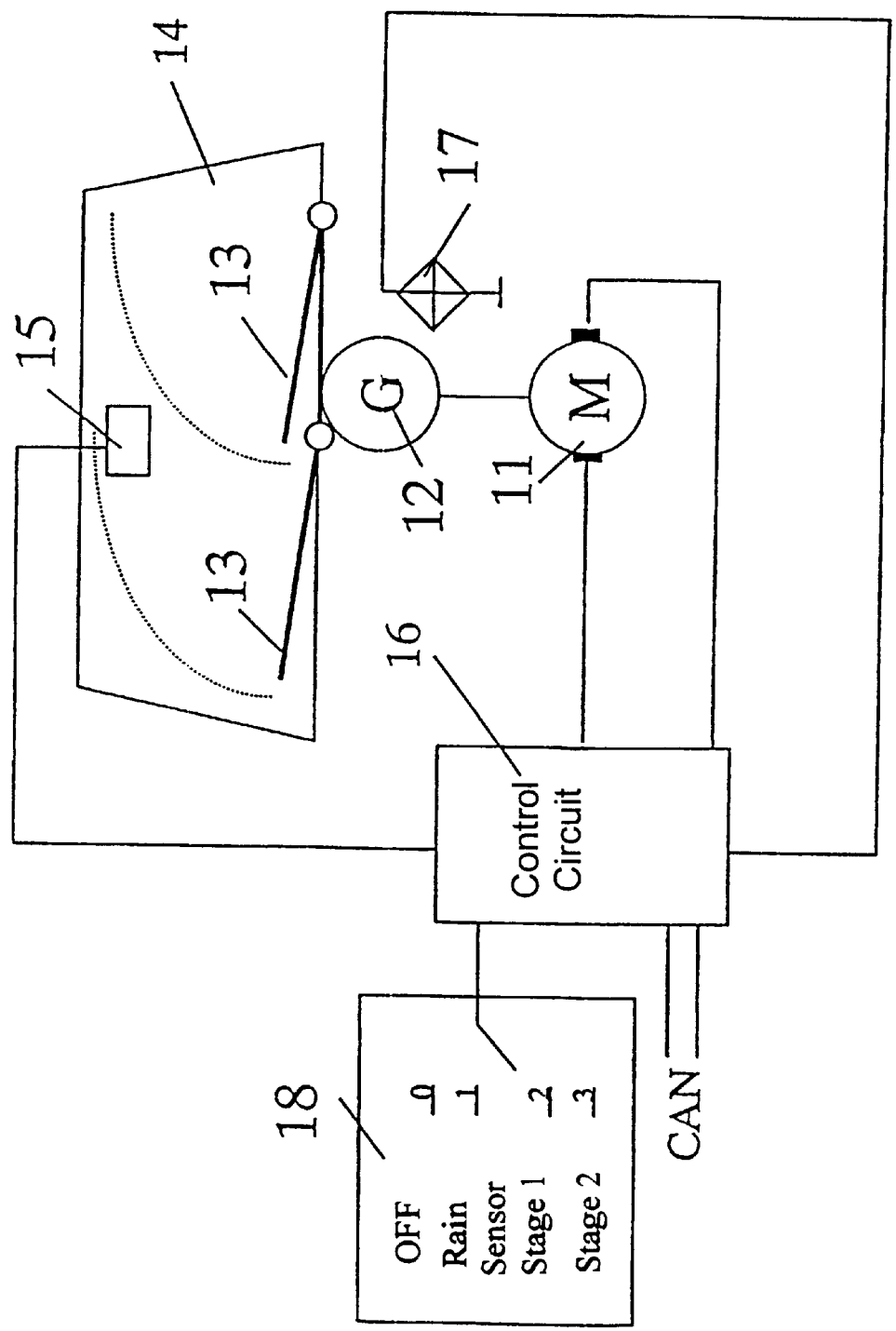
FIG. 1 is a circuit diagram of a control device for a windshield-wiper device.

A control device for a drive motor 11 imposes back-and-forth wiping cycles onto windshield wipers 13 by means of a gear 12. The windshield wipers 13 are positioned on a windshield 14 to be wiped, the windshield being allocated a rain sensor 15. The rain sensor 15 generates an electrical control signal, which is dependent on the quantity of rain per time unit that is impacting the region of the windshield covered by the sensor. The rain-quantity-dependent control signal is supplied to a control circuit 16. The control circuit 16 can determine the current rpm of the windshield-wiper motor 11, and thus the number of wiping cycles, with a measuring unit 17. In addition, a wiper switch 18 is connected, as an input unit, to the control circuit 16 either directly or via a bus system. This further switch is usually mounted as a steering-column switch to the steering column of the respective vehicle, and usually has delay-and back-shifting switching stages 1, 2, 3 for different operating modes, in addition to a zero position for shutting down the drive motor.

In a first switching stage 1, the drive motor 11 is controlled corresponding to a characteristic curve 19, which is stored in the control circuit 16, and predetermines operating data for the drive motor 11 as a function of the quantity of rain detected by the rain sensor 15. According to the operating data forming the characteristic curve 19, the drive motor 11 is operated in intervals if the rain sensor 15 detects a small quantity of rain; after each wiping cycle comprising a back-and-forth pivoting movement by the windshield wiper 13, a pause occurs until the next wiping cycle takes place. As the quantity of rain increases, the respective pause is shortened. As soon as the pause length falls below a specific value, the characteristic curve 19 controls the drive motor 11 at a lower rpm in continuous operation with a correspondingly larger quantity of rain. As the detected quantity of rain increases further, the rpm of the drive motor 11 is set at higher values until it attains its maximum value M with a large quantity of rain. As the quantity of rain decreases, the drive motor 11 is controlled in the opposite direction.

Regardless of the automatic, rain-quantity-dependent control process, the wiper switch 18 can establish a fixed rpm for the drive motor through switching into the second switching stage 2, and a higher rpm through further switching into the switching stage 3. The switching stage 2 presets, for example, a wiping-cycle number of 40 wiping actions per minute, and the switching stage 3 presets a wiping-cycle number of 55 wiping actions per minute, corresponding to the relevant guidelines. Here the maximum rpm of the drive motor 11 in the rain-quantity-dependent region of the switching stage 1 is higher than the rpm in the switching stage 3.

To permit a change in the wiping characteristic predetermined by the characteristic curve 19, corresponding to the driver's needs, the control circuit 16 is equipped with an algorithm-adaptation control, which continuously alters the characteristic-curve data as corresponding control commands are entered.

For this purpose, the wiper switch 18 ascertains when the driver changes the operating data that were preset in the automatic wiper operation in the switching stage 1 by switching into the switching stage 2 or 3. The control commands derived from this are evaluated in the algorithm-adaptation control.

If, in accordance with FIG. 2a, the wiper 13 is subjectively operating too slowly or too infrequently, the driver switches the wiper switch 18 to continuous operation in the switching stage 2 or 3. FIG. 2b illustrates this switching process for the switching stage 2, starting from the characteristic curve 19 for an operating point A1. According to FIG. 2c, in the algorithm-adaptation control, the control signal derived from the switching effects an elevation of the operating point A1 into the new operating point A11, and, simultaneously, initiates the new calculation of operating data for an entirely new characteristic curve 19.1 having a reduced inclination, but the same end point M with the largest quantity of rain to be detected. The characteristic curve 19 is thus pivoted clockwise about the point of rotation M, with the elevation from the operating point A1 to the operating point A11 being less than the absolute value of the control command between the operating point A1 and the number of cycles per time unit corresponding to the switching stage 2. In direct delay-switching from the switching position 1 into the switching position 3, it is possible that the operating point is elevated by a larger amount than in the switch from the switching stage 1 to the switching stage 2. Accordingly, if the wiper switch is again switched back into the switching stage 1 for automatic operation, the drive motor is controlled with shortened pauses in interval operation, or with an increased continuous wiper-cycle number with larger quantities of rain, corresponding to the new characteristic curve 19.1. This characteristic curve is maintained until it is no longer considered necessary to switch into the switching stage 2 or 3. In this case, the operating data are preferably not altered by more than 50% in a switching process. If a delay switching into the switching stage 2 or 3 is only effecting a change of less than 5%, the characteristic curve is advantageously no longer converted. It can be useful only to incorporate a changed characteristic curve as a new characteristic curve into the control circuit if the manual control elements switch back to the curve-controlled first switching stage within a predetermined time frame. It can also be advantageous, however, to store the individual characteristic curves via the manually-operated control elements, primarily to be retrieved by the selector switch.

FIG. 3 also illustrates the change in the characteristic curve from the operating point A1 to the operating point A11. This drawing additionally indicates that it is possible to increase the inclination of the current characteristic curve 19.1, for example, to the inclination that corresponds to the original characteristic curve 19, by means of wiper switches 18 if the rain-quantity-controlled operating point A2 presets operating data that lie above the operating data of the predetermined values in the position 2. If the wiper switch 18 is accordingly switched from the automatic switching stage 1 to the switching position 2 with a fixed, predetermined rpm, the derived control signal is negative, and presets a new operating point A22, which predominantly coincides with the original characteristic curve 19. At this operating point A22, the algorithm-adaptation control in the control circuit 16 thus generates the current characteristic curve 19, which presets the operating data for the drive motor 11 that control a reduced number of cycles per time unit, or an increase in the pause length in interval operation. The same function of increasing the inclination can also be performed in that the wiper switch is switched from the rain-automatic state 1, when the ignition is still engaged or the vehicle drive motor is still running, into the zero position, and the control command obtained from this is transmitted to the algorithm-adaptation control.

Of course, it is also possible to provide control elements that are actuated independently of the wiper switch in order to influence the inclination of the characteristic curve, or to select different, individual characteristic curves; the elements are actuated by the driver or a customer-service site. The vehicle control can also process memory functions for seat adjustment, mirror adjustment or an ignition-key code to select a driver-specific characteristic curve. When one of these driver-dependent functions is retrieved, the associated characteristic curve can be selected for the wiper operation.

In an advantageous modification, when the steering-column switch is switched into the OFF stage, it is determined whether the user actually only wishes to shut off the windshield wiper 13, or the interval pauses seem to the user to be too short, that is, longer interval pauses are required with a small current quantity of rain. If the switch is switched off because the interval pauses appear to be too short, it is advantageous to adapt the characteristic curve 19. If wiping is actually to be stopped, no adaptation is necessary. To distinguish between these two scenarios after the switch is switched to the OFF position for a limited time, particularly a maximum of one minute, the rain sensor 15 is read further. If the rain sensor 15 no longer recognizes rain, it is assumed that the switch has actually been shut off. If the quantity of rain measured in the limited time frame exceeds a predetermined threshold value, it is assumed that the interval pause was too short, and the characteristic curve 19 is adapted.

The result is a control device for the drive motor of a windshield-wiper device, in which a rain-quantity-dependent characteristic curve can be altered at a later time for controlling the drive motor, with manually-operated control elements being used to input corresponding control commands. These control elements can preferably be formed by multi-stage wiper switches of the vehicle that are provided anyway. With respect to the current characteristic curve in the instantaneous operating point, which is predetermined by the detected quantity of rain, it is ascertained whether the driver desires a higher or lower number of wiping cycles in the further switching process. A corresponding change in the increase or course of the characteristic curve is derived from this information.

What is claimed is:

1. A control device for the drive motor of a windshield-wiper device of a vehicle, particularly a motor vehicle, including: a manually-operated wiper switch; a control circuit means, which is activated by the manually-operated wiper switch, for automatically controlling the drive motor in a switching stage of the wiper switch according to a characteristic curve of wiper speed cycles versus quantity of moisture on the vehicle windshield and as a function of a signal of a rain sensor on the vehicle windshield indicating the quantity of moisture; and wherein the control circuit means pivots the characteristic curve about an upper end point in response to a switching operation of the manually-operated control element of the wiper switch from said switching stage.

2. The control device according to claim 1, wherein: the wiper switch has a plurality of switching stages, with the automatic characteristic-curve operation being associated with the first switching stage and one or more additional switching stages being associated with one or more fixed wiper speeds; and said control mans includes means for performing, during windshield-wiper operation, an adaptation algorithm for generating a new characteristic curve, with the new characteristic curve having a fixed said upper end point, and having an inclination or course which is altered analogously to the difference between the current operating data that are predetermined by current characteristic curve and the operating data that are predetermined by additional switching positions when an additional switching position is set manually.

3. The control device according to claim 2, wherein: the means for performing reduces the inclination or course of the new characteristic curve when the operating data for the drive motor, which are predetermined by the current characteristic curve, are lower than the operating data that are predetermined by the additional switching stage, and an additional switching position is set manually.

4. The control device according to claim 2, wherein: the means for performing increases the inclination or course of the new characteristic curve when the operating data for the drive motor, which are predetermined by the current characteristic curve, are higher than the operating data that are predetermined by the additional switching stage, and an additional switching position is set manually.

5. The control device according to claim 1, wherein: said control means only incorporates the altered characteristic curve as a new characteristic curve if the back-switching of the manual control elements to the characteristic-curve-controlled first switching stage is effected within a predetermined time frame.

6. The control device according to claim 1, wherein: said control means limits the change in the operating data that are predetermined by an updated characteristic curve from the operating data of the previous characteristic curve to no more than 50%.

7. The control device according to claim 1, wherein: the control means updates the characteristic curve until the difference between the operating data from two consecutively-generated characteristic curves is less than 5%.

8. The control device according to claim 1, wherein: a plurality of characteristic curves that are independent of one another e are stored in and retrieved from the control circuit means.

9. The control device according to claim 8, wherein: the individual characteristic curves are activated individually via manually-operated selector switches in the control circuit means for controlling the operating data of the drive motor.

10. A method of operating a control device according to claim 1, includes correcting a current characteristic curve by switching the wiper switch from the first characteristic-curve-operated switching stage to one of the additional switching stages; and as a function of this process, determining the course of a new updated characteristic curve for the first switching stage; and, after the wiper switch has been switched back to the characteristic-curve-operated switching stage, controlling the drive motor corresponding to the new updated characteristic curve.

11. The method of operating a control device according to claim 10, wherein: the rain sensor is read further for a limited time after the wiper switch has been shut off.

12. The method of operating a control device according to claim 11, further including adapting the characteristic curve when the rain sensor detects at least a predetermined quantity of rain within a limited time.

13. The control device according to claim 3, wherein: the means for performing increases the inclination or course of the characteristic curve when the operating data for the drive motor, which are predetermined by the current characteristic curve, are higher than the operating data that are predetermined by the additional switching stage and an additional switching position is set manually.

14. The control device according to claim 2, wherein said control means only incorporates the altered characteristic curve as a new characteristic curve if the back-switching of the manual control elements to the characteristic-curve-controlled first switching stage is effected within a predetermined time frame.

15. The control device according to claim 2, wherein said control means limits the change in the operating data that are predetermined by an updated characteristic curve from the operating data of the previous characteristic curve to no more than 50%.

16. The control device according to claim 2, wherein the control means updates the characteristic curve until the difference between the operating data from two consecutively-generated characteristic curves is less than 5%.

* * * * *